(12) United States Patent
Griffin

(10) Patent No.: US 12,509,277 B2
(45) Date of Patent: Dec. 30, 2025

(54) BEVERAGE CONTAINER INFUSION PORT AND METHOD OF USE

(71) Applicant: Esther Brans, Lakewood, CO (US)

(72) Inventor: Daniel Griffin, Littleton, CO (US)

( * ) Notice: Subject to any disclaimer, the term of this patent is extended or adjusted under 35 U.S.C. 154(b) by 0 days.

(21) Appl. No.: 17/538,680

(22) Filed: Nov. 30, 2021

(65) Prior Publication Data

US 2022/0089321 A1 Mar. 24, 2022

Related U.S. Application Data

(63) Continuation-in-part of application No. 17/150,769, filed on Jan. 15, 2021, now abandoned.

(60) Provisional application No. 62/962,753, filed on Jan. 17, 2020.

(51) Int. Cl.
| | | |
|---|---|---|
| *B65D 17/50* | (2006.01) | |
| *B01F 33/501* | (2022.01) | |
| *B65D 17/353* | (2006.01) | |
| *B01F 101/14* | (2022.01) | |
| *B01F 101/15* | (2022.01) | |

(52) U.S. Cl.
CPC ...... *B65D 17/508* (2013.01); *B01F 33/50111* (2022.01); *B65D 17/353* (2018.01); *B01F 2101/14* (2022.01); *B01F 2101/15* (2022.01); *B65D 2517/0047* (2013.01)

(58) Field of Classification Search
CPC ............... B65D 17/353; B65D 17/508; B65D 2517/0047; B65D 17/506
USPC ........................................................ 220/361
See application file for complete search history.

(56) References Cited

U.S. PATENT DOCUMENTS

| | | | | |
|---|---|---|---|---|
| 2,119,502 | A * | 5/1938 | Bertels | B65D 17/353 |
| | | | | 206/217 |
| 4,545,497 | A | 10/1985 | Martha, Jr. | |
| D359,295 | S * | 6/1995 | Szabo | D8/499 |
| 5,573,139 | A * | 11/1996 | Yeh | A47G 19/2272 |
| | | | | 215/396 |
| 5,722,561 | A * | 3/1998 | Biondich | B65D 17/503 |
| | | | | 220/710 |
| 6,135,842 | A * | 10/2000 | LaFata | A63H 33/28 |
| | | | | 446/16 |
| 8,627,861 | B2 | 1/2014 | Py et al. | |
| 9,877,607 | B2 | 1/2018 | Beckman et al. | |
| 10,202,214 | B2 | 2/2019 | Py | |
| 2012/0216909 | A1 * | 8/2012 | Levy | B65D 51/002 |
| | | | | 141/2 |
| 2014/0311617 | A1 * | 10/2014 | Py | A61J 1/1425 |
| | | | | 141/89 |
| 2021/0245921 | A1 * | 8/2021 | Chaurette | B65D 17/28 |

FOREIGN PATENT DOCUMENTS

| | | |
|---|---|---|
| KR | 100 916 540 | 9/2009 |
| WO | WO 2013/042949 A2 | 3/2013 |

\* cited by examiner

*Primary Examiner* — Anthony D Stashick
*Assistant Examiner* — Raven Collins
(74) *Attorney, Agent, or Firm* — Reilly Intellectual Property Law Firm

(57) ABSTRACT

There is provided an infusion septum for a beverage container and more specifically, an infusion septum that is integrated within a beverage can end or a container cap and a method of infusion.

12 Claims, 12 Drawing Sheets

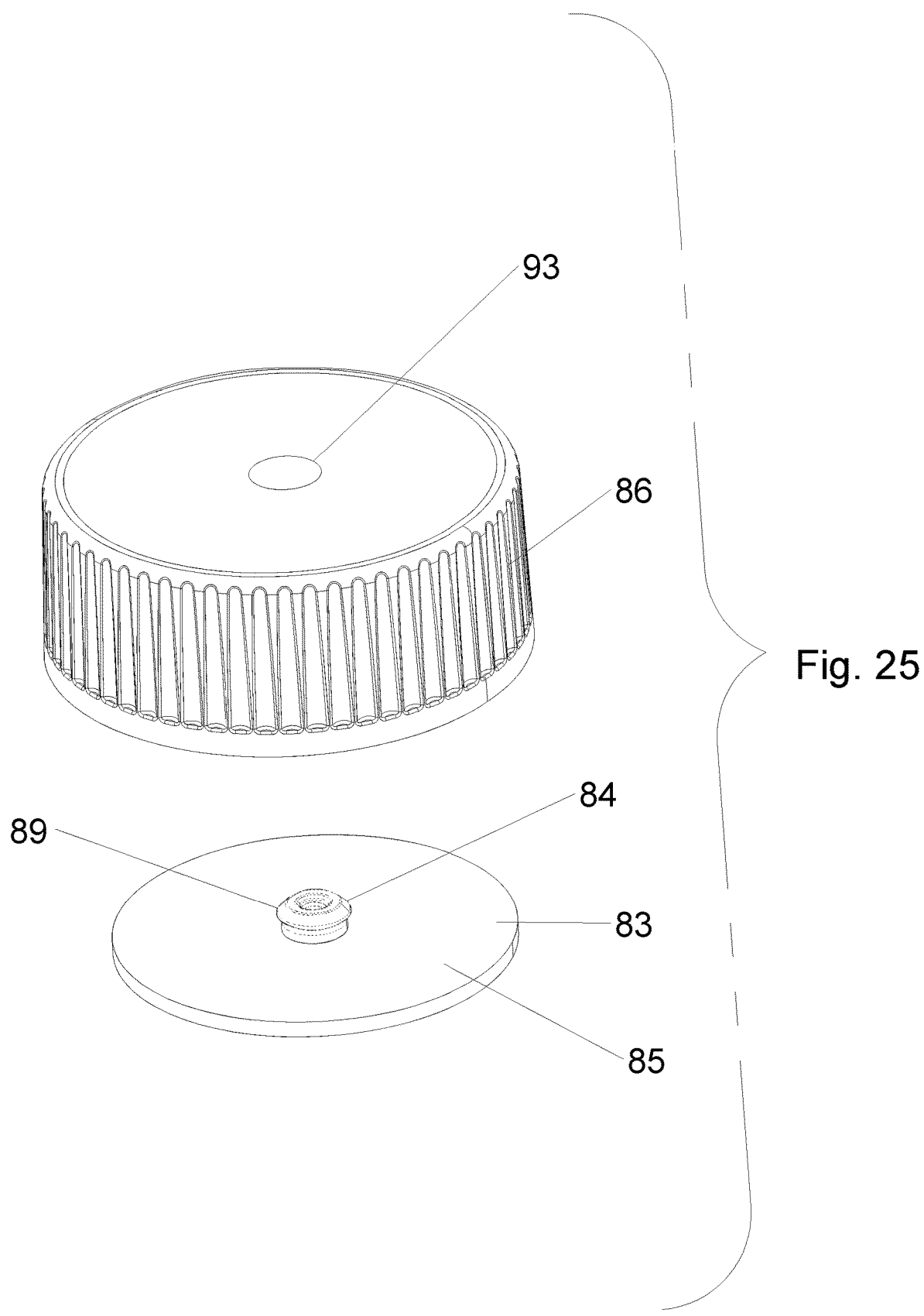

BEVERAGE CONTAINER INFUSION PORT AND METHOD OF USE

Figure 1:
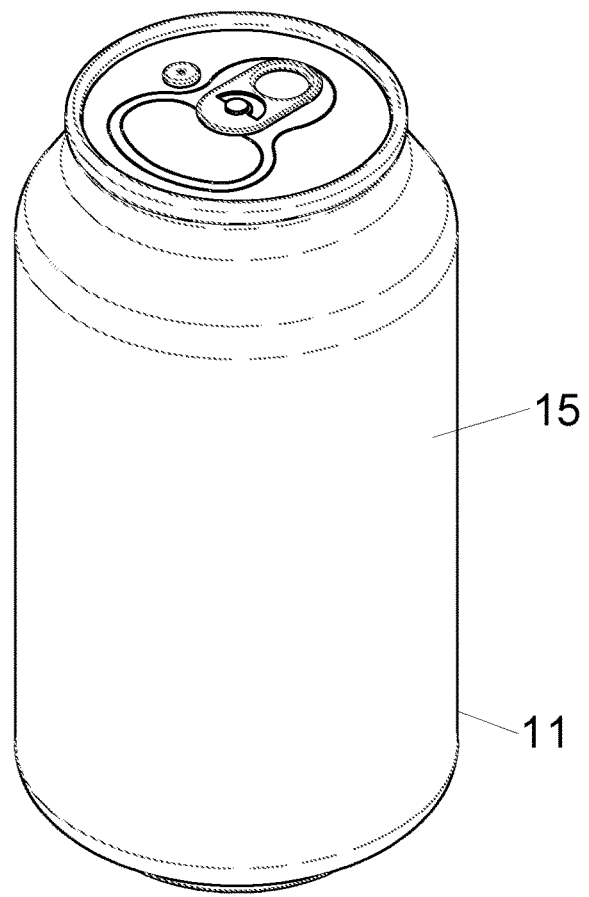

The following discloses an infusion port for a beverage container and more specifically, an infusion port that is integrated within a beverage can end or a beverage container cap and a method of infusion.

BACKGROUND

Caps used with liquid containers in which withdrawal of a medicine or substance can be achieved without removing the cap are common in the industry. Pierceable septa are generally used for dispensing medication using a syringe to withdraw the medicine where a reliably sealed container is required. Generally, the cap is made up of a resilient material that allows removal of the contents of a medicinal container without breaching the sterility of the container. Further, due to the resilient nature of the cap material, a seal will form around the needle as it penetrates the cap and a partial vacuum will be formed within the container as liquid is withdrawn into the needle. Once the needle is withdrawn, the septum automatically reseals, maintaining a reliable seal. This type of septum is commonly used to withdraw medicine from sterile containers.

There is a need for an infusion system in the beverage industry whereby a sealed beverage container may be accessed after purchase or after shipping to infuse the beverage with the infusant of choice and provide automatic resealing. There is provided a beverage container sealing end having an integrated infusion septum comprising an infusion port opening located on the sealing end, the integrated infusion septum having a one-piece base member incorporating a neck collar member and a guide member with a location recess, and the guide member centered over the infusion port opening, the guide member adapted to be drawn through the port opening.

There is also provided a beverage can end having a standard tab assembly for non-resealable opening of the can end and an integrated infusion septum comprising a base member integrated with a neck collar and location recess within the neck collar, a partially removable guide member integrated with the neck collar adapted for positioning of the infusion port in a port opening, the guide member and the neck collar adapted to pass through the infusion port opening in the can end, and the base member and the neck collar adapted to form an interference fit with the port opening. Further, there is provided a beverage container sealing end having an integrated infusion septum, comprising a circumferentially extending base member with an annular rim, a lower stepped member and a guide member with an infusion port extending from the base member. The sealing end having a centrally located port opening, the guide member adapted to pass through the port opening on a lower side of the sealing end and the guide member and the port opening forming an interference fit.

A method of infusing a pre-filled beverage container using an integrated infusion septum as also provided using a modified beverage can end with an integrated self-sealing infusion septum, securing the modified can end to the pre-filled beverage container, inserting a piercing member into an infusion port within the self-sealing infusion septum, the piercing member in fluid communication with a dispensing member containing an infusant, passing the piercing member through a location recess within the infusion port and into an interior of the beverage container, injecting the infusant from the dispensing member into the container, intermixing the infusant with the beverage contained within the beverage container, and withdrawing the piercing member for self-sealing of the infusion port.

DRAWINGS

Figure 2:
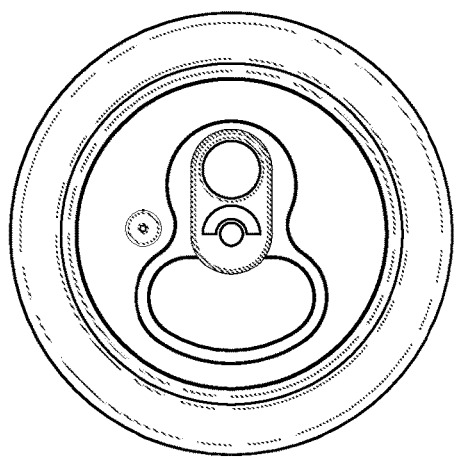
Figure 3:
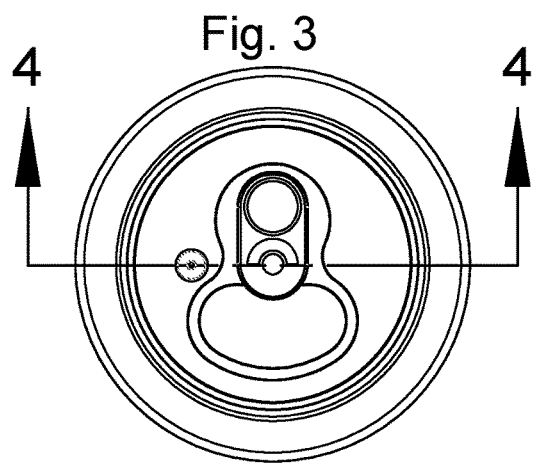
Figure 4:
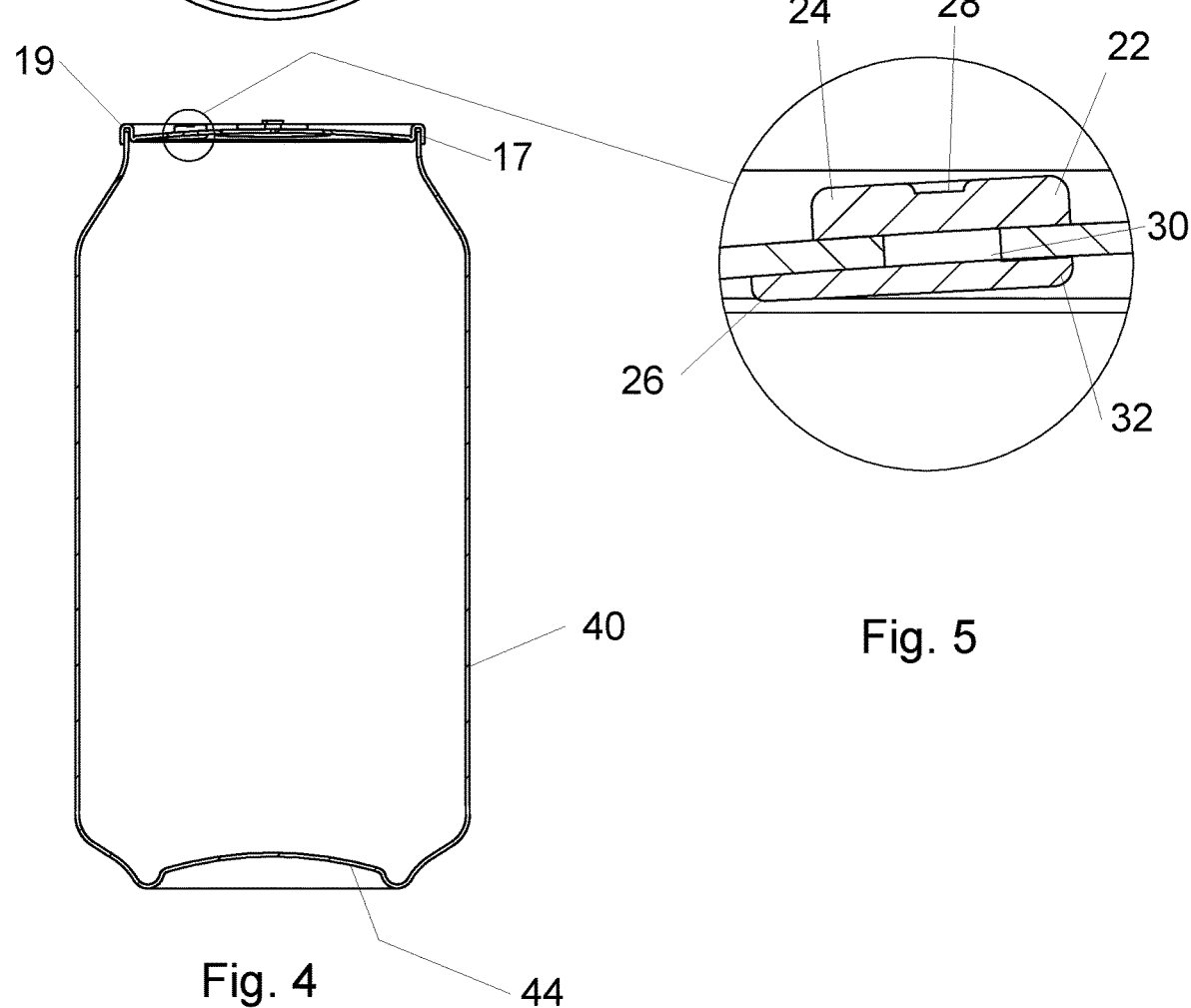
Figure 5:
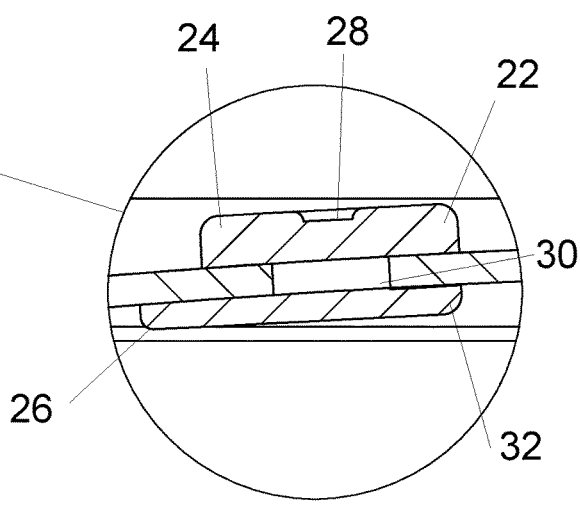
Figure 6:
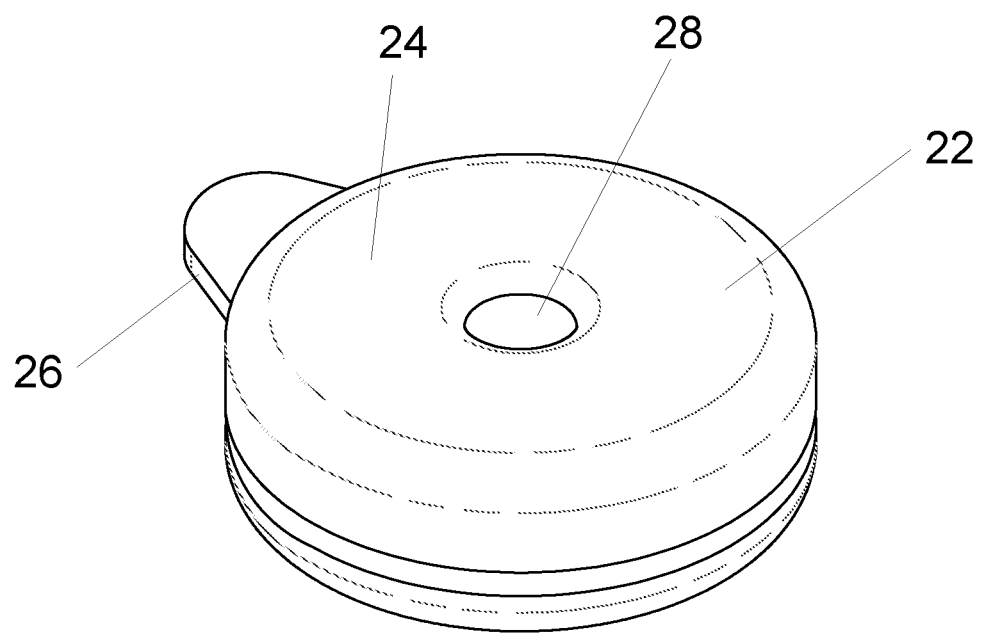
Figure 7:
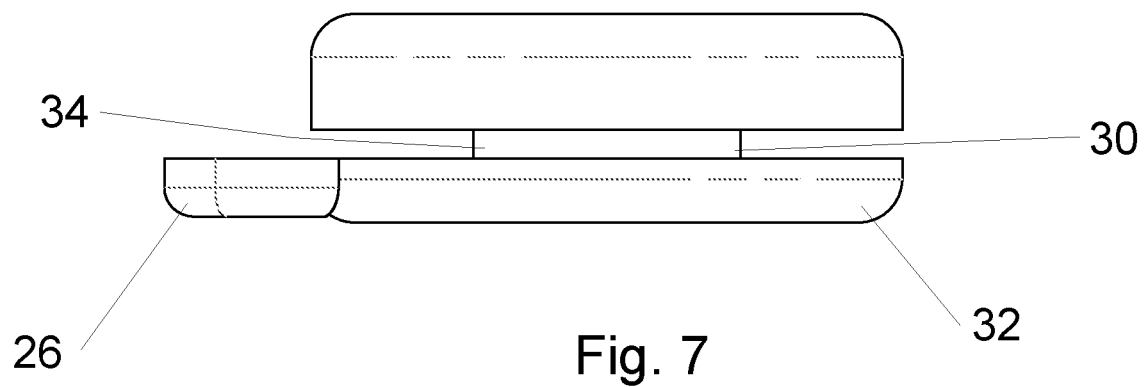
Figure 8:
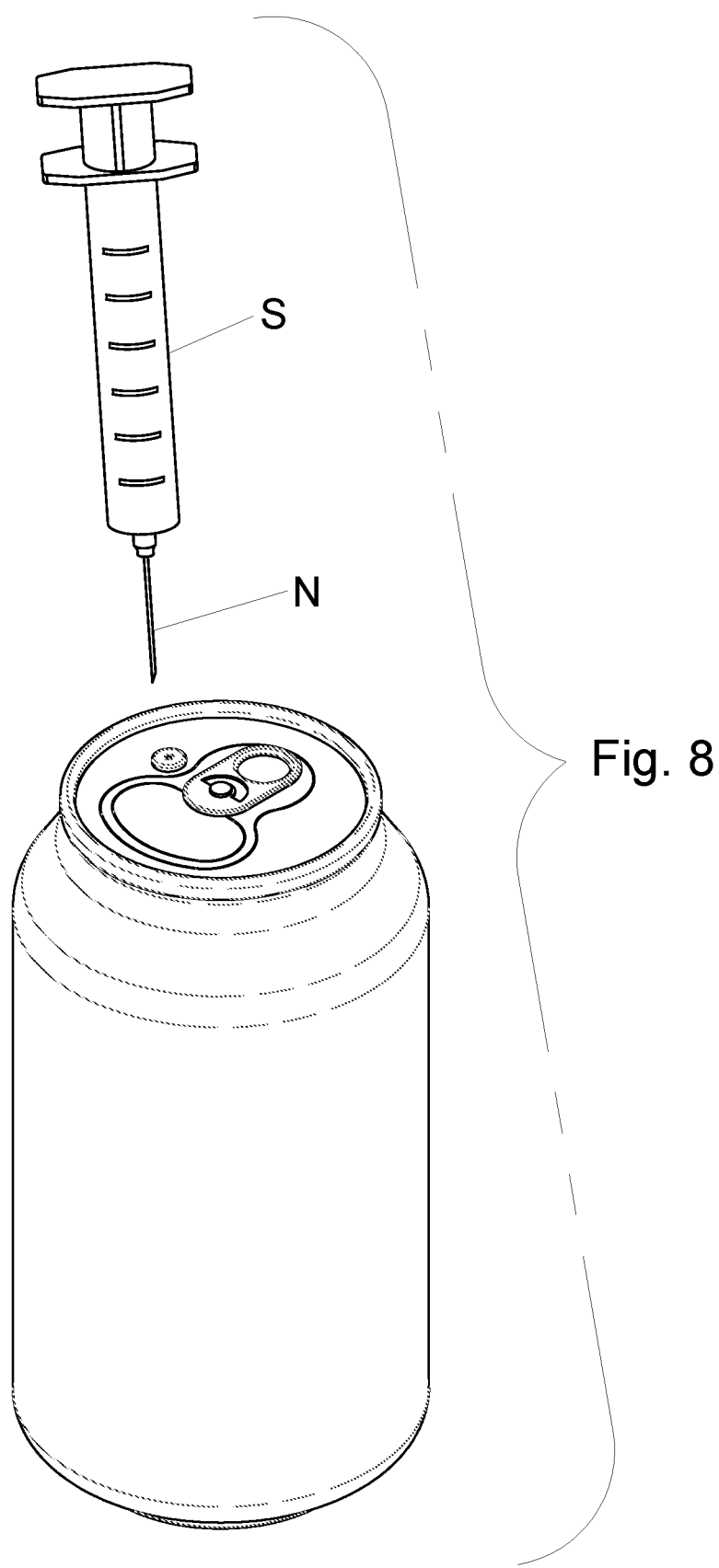
Figure 9:
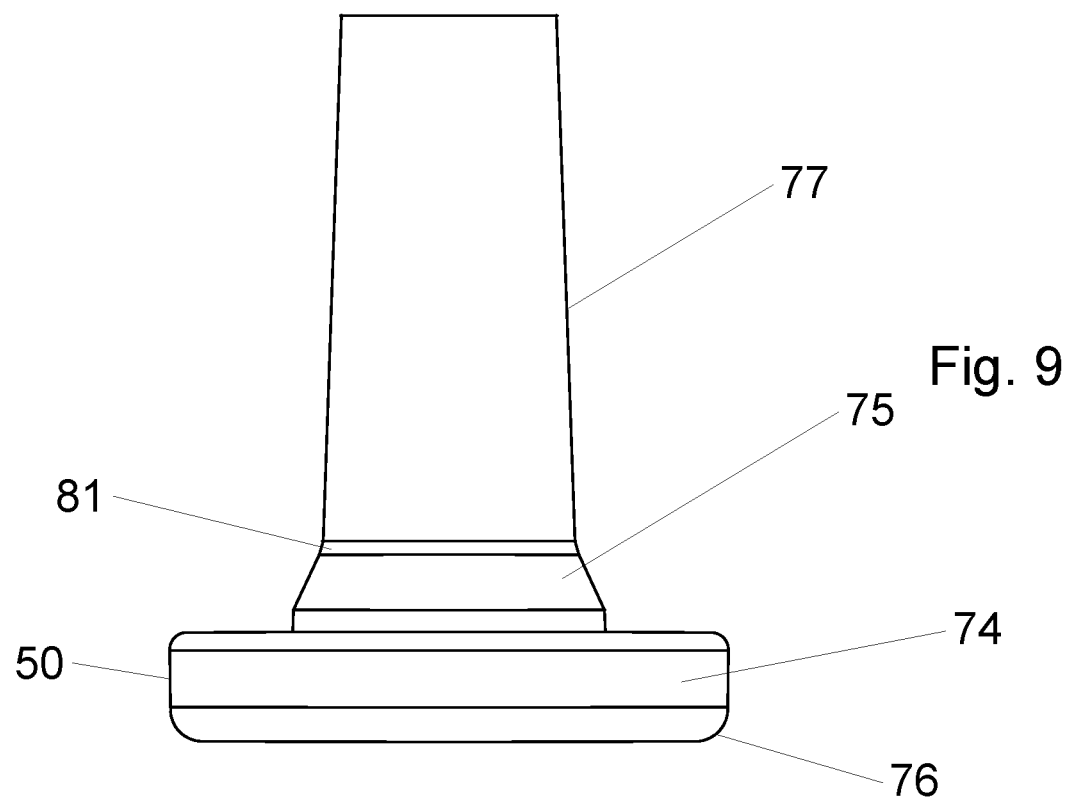
Figure 10:
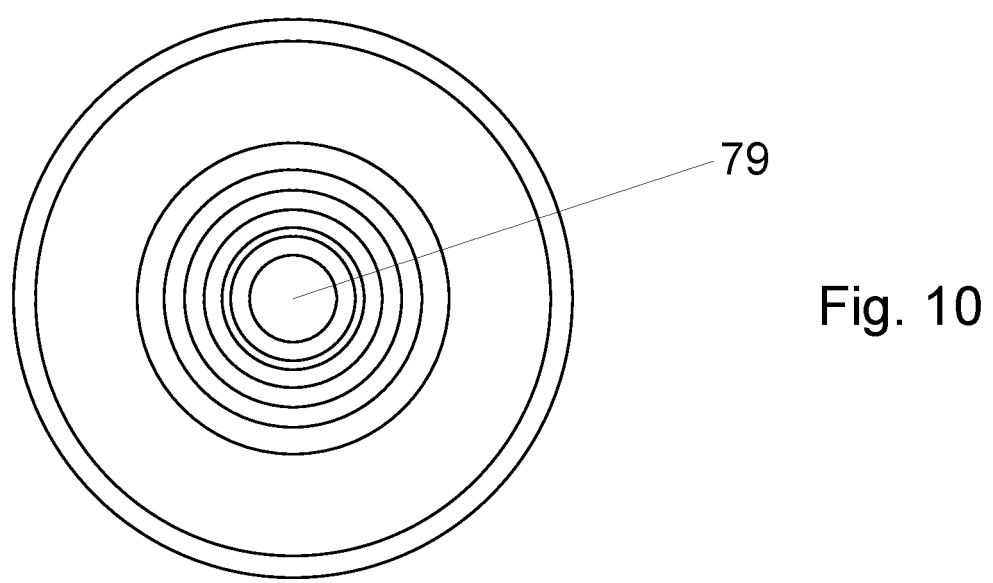
Figure 11:
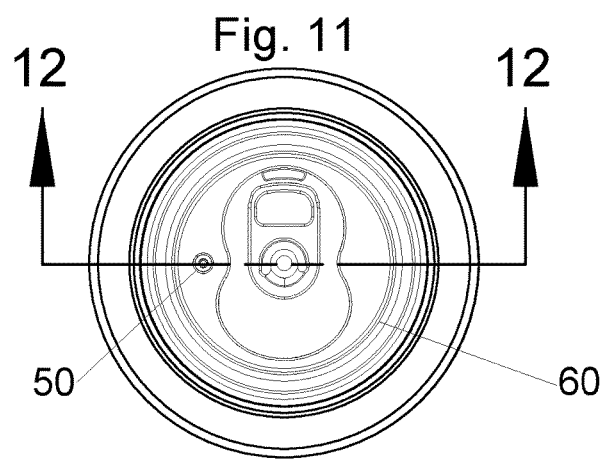
Figure 14:
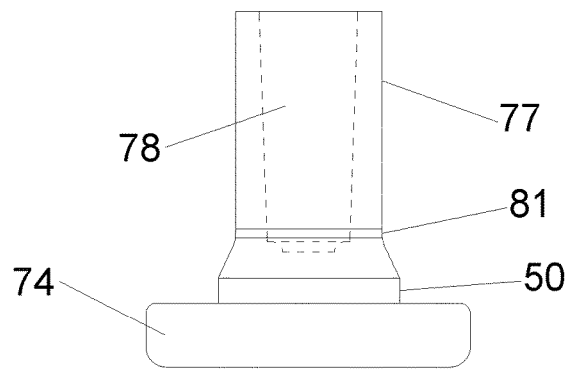
Figure 12:
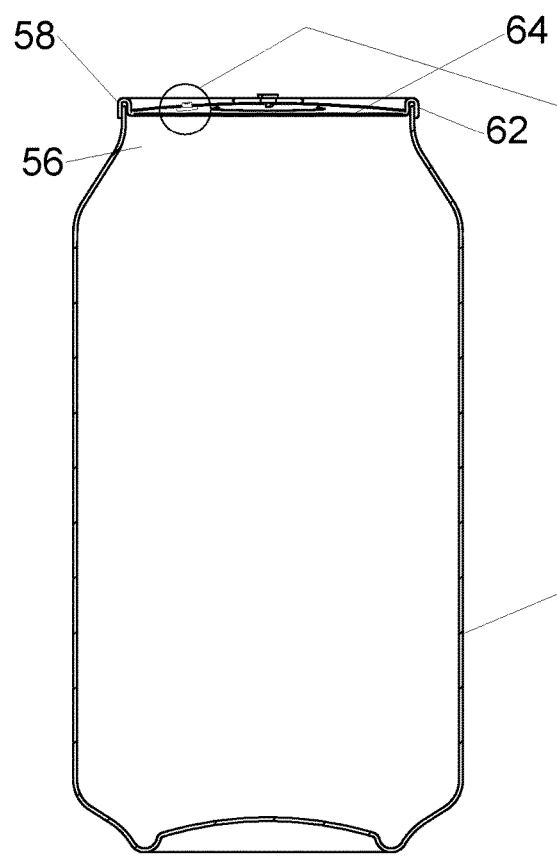
Figure 13:
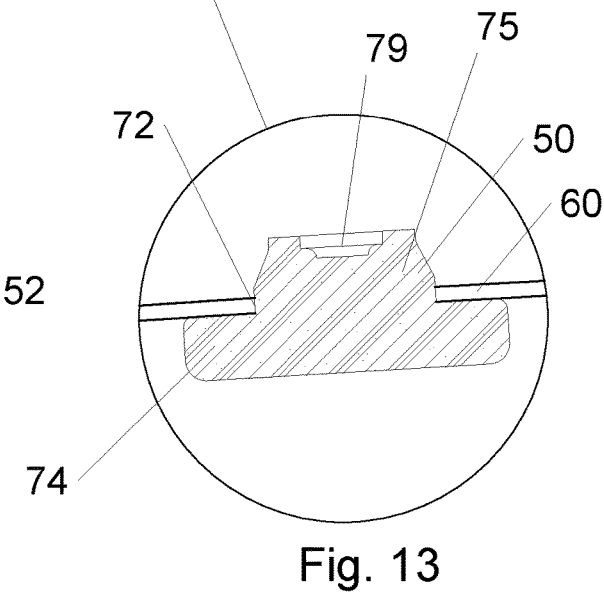
Figure 15:
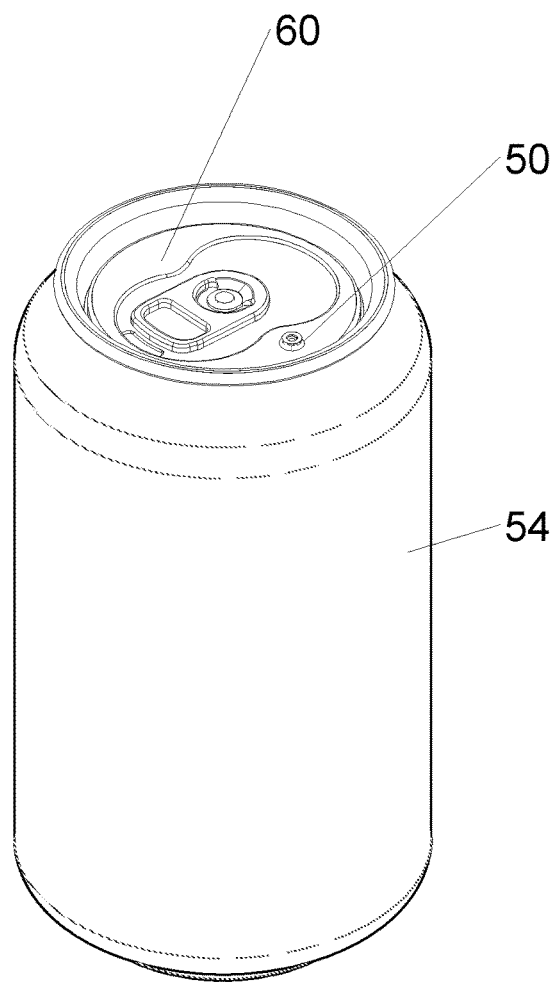
Figure 16:
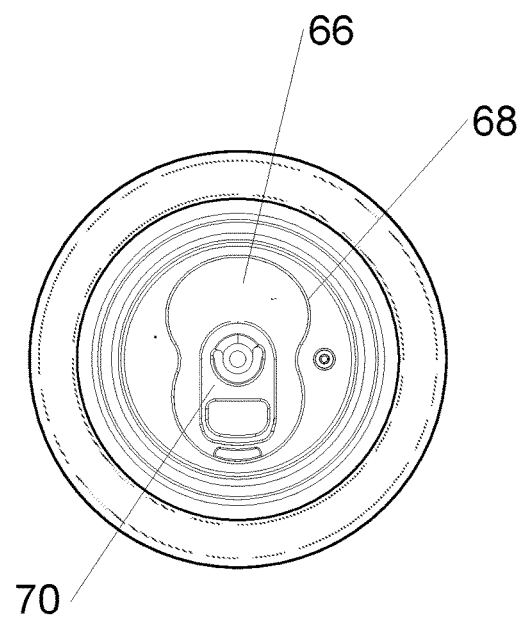
Figure 17:
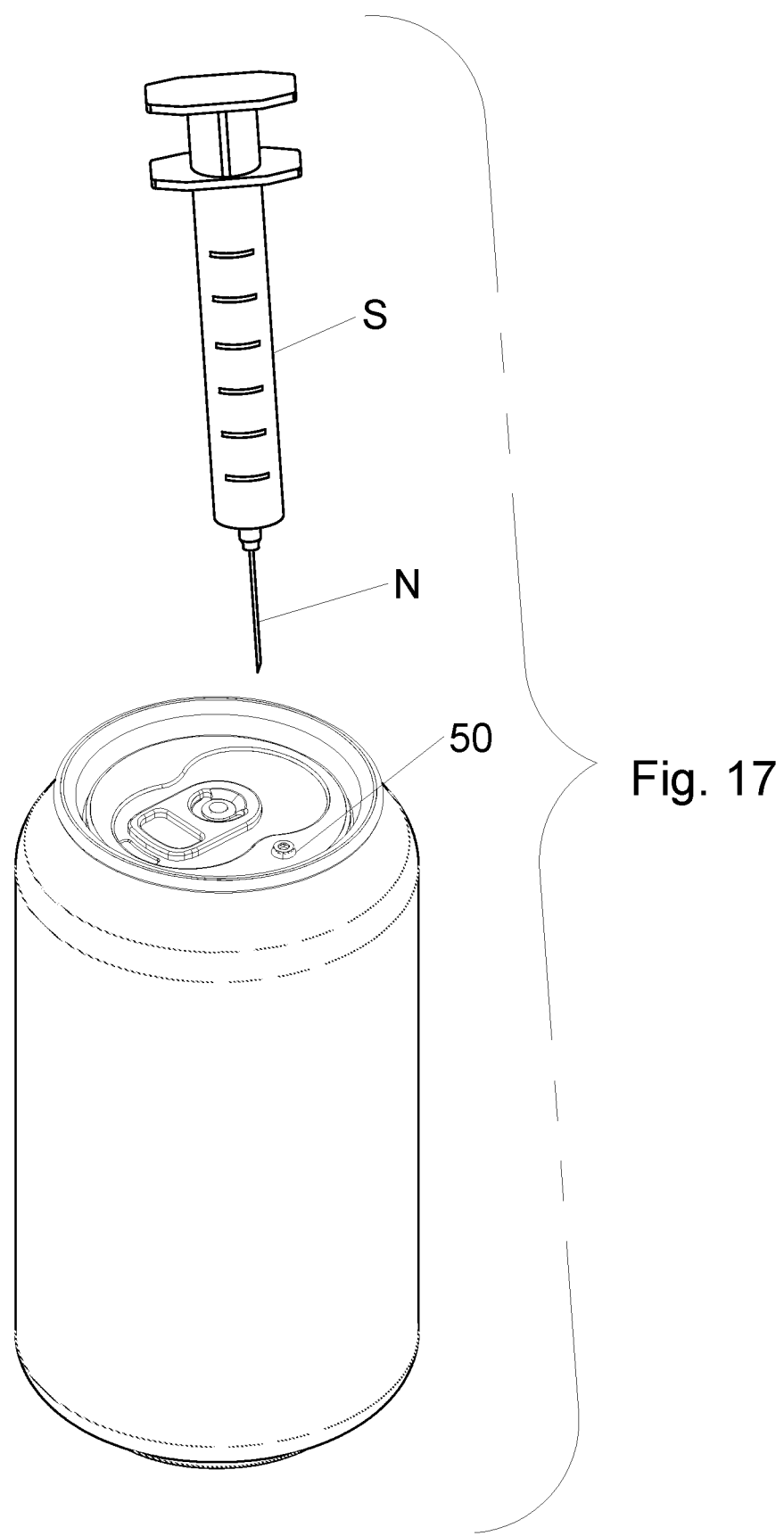
Figure 18:
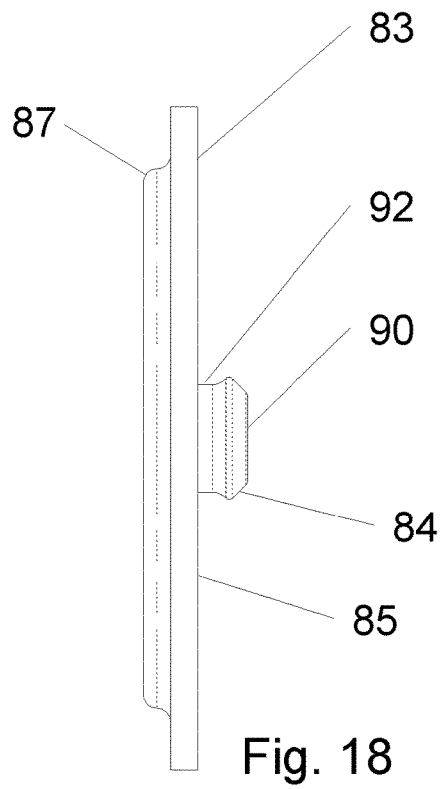
Figure 19:
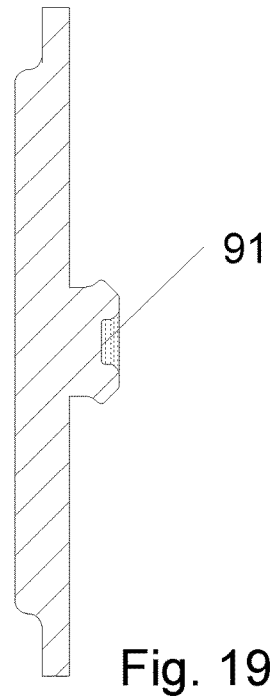
Figure 20:
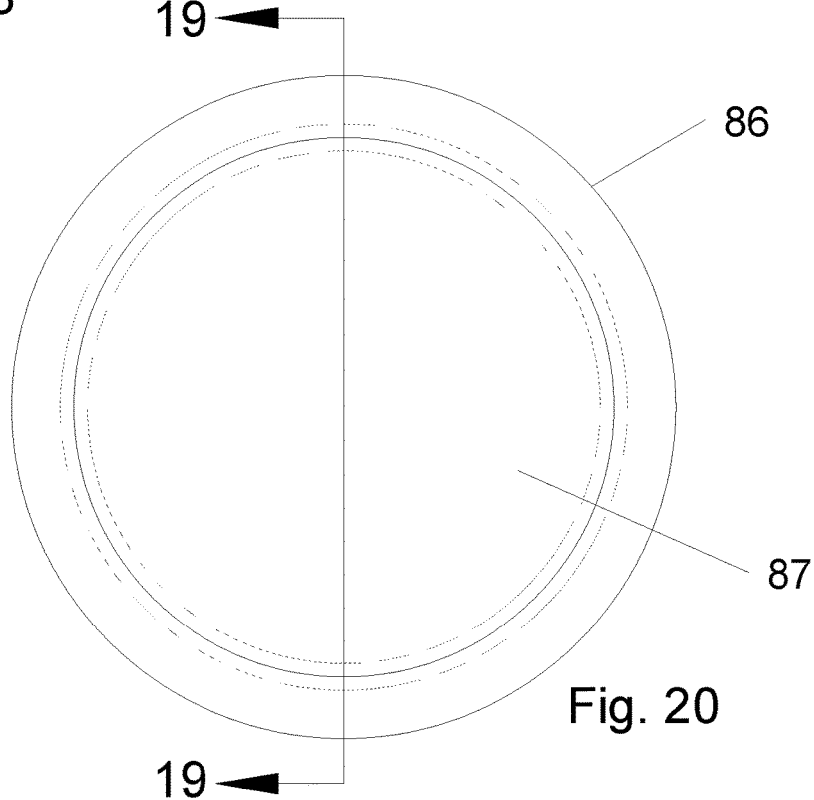
Figure 21:
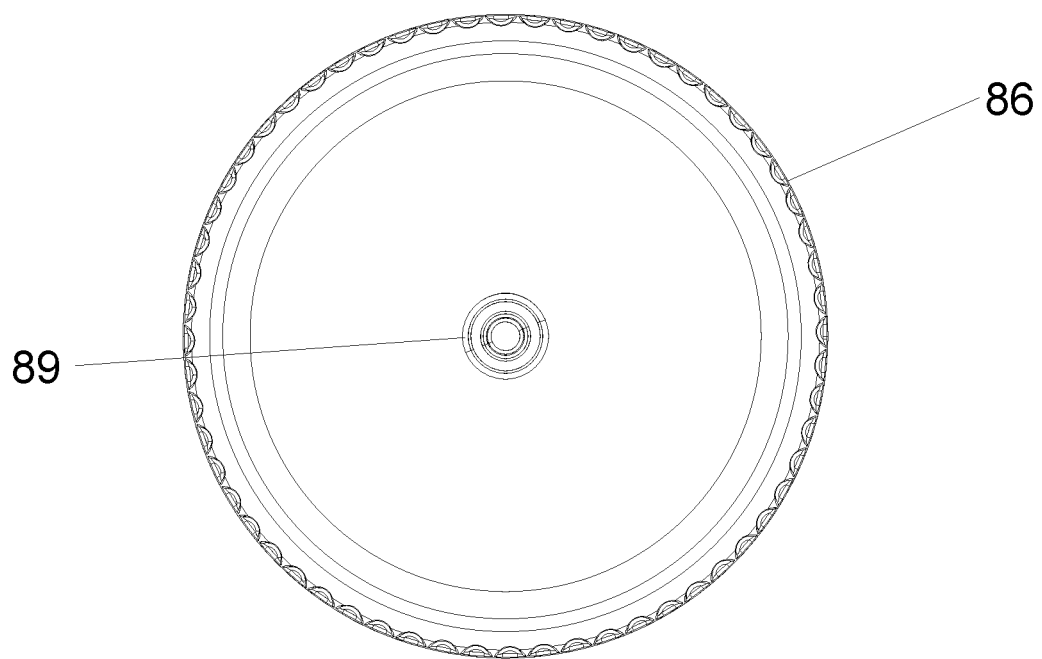
Figure 22:
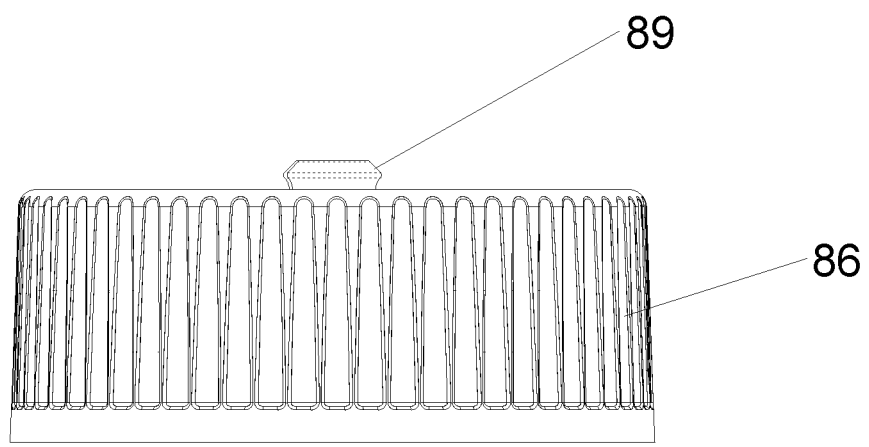
Figure 23:
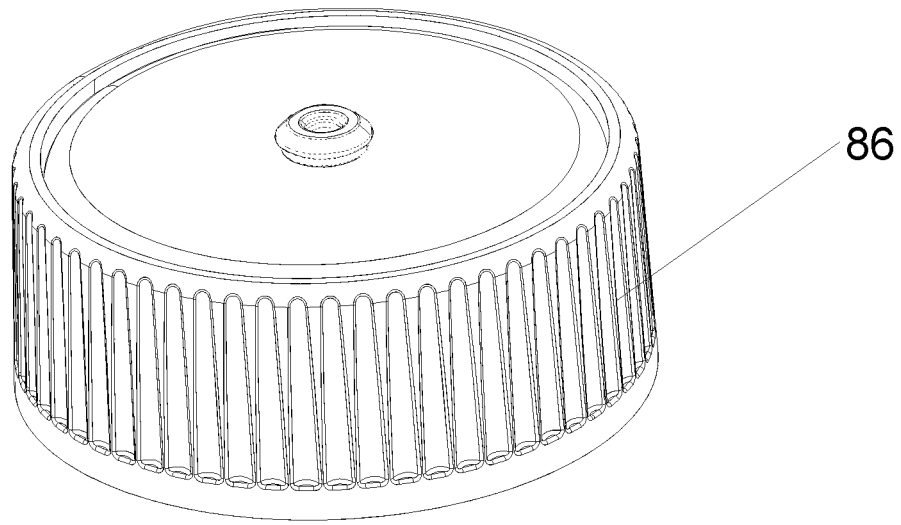
Figure 24:
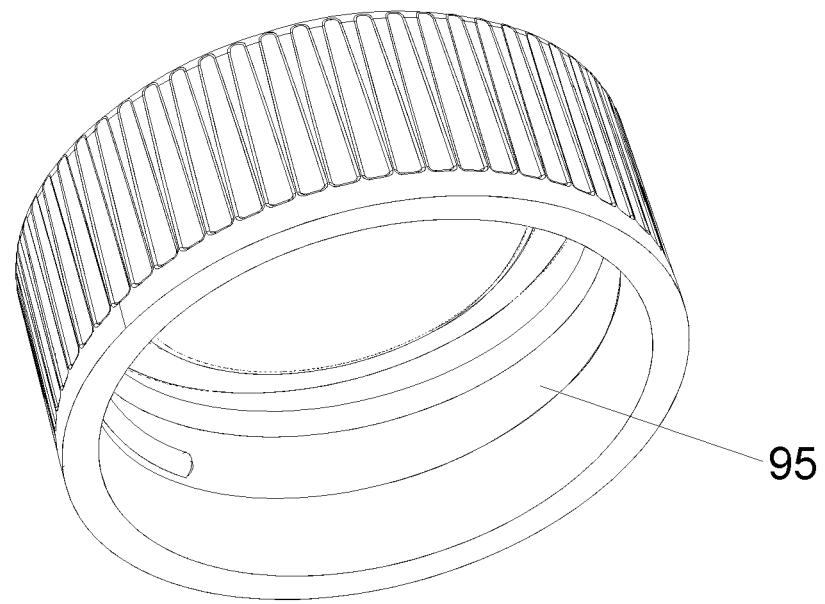

FIG. 1 is a perspective view of a beverage can and can end with integrated infusion port;
FIG. 2 is a top view of FIG. 1;
FIG. 3 is a top view of FIG. 1;
FIG. 4 is a side view of FIG. 1;
FIG. 5 is a cross-section view about lines 4-4 of FIG. 3;
FIG. 6 is a perspective view of the infusion port of FIG. 1;
FIG. 7 is a side view of FIG. 6;
FIG. 8 is a perspective view of FIG. 1 showing use;
FIG. 9 is a side view of an alternate infusion port;
FIG. 10 is a top view of FIG. 9;
FIG. 11 is a top view of FIG. 9 integrated within a beverage can end;
FIG. 12 is a cross-sectional view taken about lines 12-12 of FIG. 11;
FIG. 13 is a detail view of FIG. 12;
FIG. 14 is a side view of FIG. 9;
FIG. 15 is a perspective view showing the infusion port of FIG. 9;
FIG. 16 is a top plan view of FIG. 15;
FIG. 17 is a perspective view of FIG. 15 showing use;
FIG. 18 is a side view of an alternate form of infusion port;
FIG. 19 is a cross-sectional view taken about lines 19-19 of FIG. 20;
FIG. 20 is a bottom view of FIG. 18;
FIG. 21 is a top view of the infusion port shown in FIG. 18 with a cap member:
FIG. 22 is side view of FIG. 21;
FIG. 23 is a side perspective view of FIG. 21;
FIG. 24 is a bottom perspective view of FIG. 21; and
FIG. 25 is an exploded view of FIG. 21.

DESCRIPTION

The following describes an infusion system in a single serve or multi-serve beverage container for imparting flavor, herbs, supplements into beverages such as beer or non-alcoholic beverages.

In a first form shown in FIGS. 1-8, there is provided a beverage container having a can body 15 defined by a cylindrical sidewall 11 including a closed bottom wall integrally formed with the sidewall 11. The sidewall 11 is tapered at both upper and lower ends to provide greater structural integrity for pressurized contents. The can body 15 is generally a conventional drawn and ironed aluminum alloy can body that is commercially used for carbonated and other beverages. Steel may also be used for the can body, such as is common in Europe. The manufacture of the can body is well known in the prior art. The can body 15 has an open upper end 13 with a circular top edge 17 that is oriented in a plane perpendicular to the vertical axis of the sidewall 11. The can body 15 may be a single serve can or larger size to accommodate a larger volume of beverage. The can body is pre-filled with the chosen beverage prior to placement of a can end.

A beverage can end 12 has a concentric shape with a circular periphery around which is formed a raised annular rim 14 projecting upwardly above a flat surface 16. Except as previously described, the can end 12 of the can 40 of FIG.

1 is also a generally conventional aluminum alloy can end member of the type currently commercially used for beverage cans having drawn and ironed one-piece can bodies. Thus, the procedures, and its general overall configuration as well as the manner in which it is secured to the top edge 17 of the can body 15, are all well-known in the art.

Once the can end 12 is mounted on the open upper end 13 of the beverage-filled can body 15, in a known manner, the rim 14 engages an upper edge 17 of the can body along a continuous annular double seam 19. The circular flat surface 16 lies substantially in a horizontal plane. The can end 12 has a scored opening 18 through which the beverage contained in the can may be poured or removed by drinking directly from the can or with a straw. Generally, and well known in the prior art, the scored opening 18 has a centrally located scored portion 21 on the metal of the can end 12 and a riveted pull tab system 20 for parting the can end metal along the score line 12 to open the first aperture 18.

The can end 12 includes an infusion port opening 34 that is punched through the can end and is defined by a circular opening that is formed near a peripheral edge of the can end 12. The diameter of the port opening is in the range of 3/16 to 1/8 inches and is designed to receive an infusion septum 22. The infusion septum 22 has an upper collar 24 that is defined by a circular shaped outwardly extending member 25 having edges 25, a locator or infusion port 28 that is centrally located along the upper surface of the upper collar 24 forming a circular indentation or recessed portion and having a reduced thickness in comparison with the upper collar 24. The locator port is aligned over the port opening 34.

A gate member 30 forms a bridge between the upper collar 24 at the locator port, the port opening 34 and a base member 32 with a tab member 26. The gate member provides a path or conveyor for a piercing member to pass through the port opening 34. The base member 32 also forms part of the septum 22 and is secured to a lower surface 37 of the can end 12 by means of overmolding to be described in more detail, and to the gate member 30. The base member 32 is also defined by a circular shaped outwardly extending member having edges 39 and a lower portion of the base member 32 is in fluid communication with the contents of the beverage can. The upper collar 24 with the locator port 28 is centered over the port opening 34 with a gate member 30 between the upper collar 24 and the base member 32 to provide a pierceable sealing member to allow for infusion. The locator port 28, the gate member 30 and the base member are all designed to be penetrated by a piercing member such as a needle and capable of resealing.

The infusion septum 22 is preferably made of a molded resilient plastic material such as polyethylene, vulcanized rubber, silicone, elastomers of any kind, thermoplastic elastomer (TPE) with a durometer or shore hardness rating between 35A to 80A, but preferably 35A to 50A. This is generally medical grade self-sealing rubber that is easily penetrable by needles ensuring a leak free seal without fragmentation after penetration and self-sealing.

The formation of the port opening 34 in the can end 12 is accomplished by first using a mechanical/pneumatic punch press and creating an opening that is approximately 0.125 inches in diameter. This is a preferable dimension but other dimensions may be used without departing from the scope. Another method is to form the opening within the injection mold with a moveable punch pin and vacuum to remove any waste material. The punch pin method is preferable as it allows for precise hole placement to insure a centered infusion port.

The infusion septum 22 may be formed with injection overmolding of the elastomer. The port may also be manufactured using compression molding and liquid silicone injection molding (LIM). Further, the port may also be formed using a two piece ultrasonically welded unit. The over-molding of the upper collar 24, the gate member 30 and the base member 32 are preferably completed in one process with the gate member 30 injected through the lower surface 37 of the can end 12. The molding process may occur with the gate member 30 being injected from the top surface or lower surface 37 of the can end 12 without departing from the scope. Further, a two-step process may be used where the gate member 30 and either the upper collar 24 or base member 32 are created first, the product is cooled and then the infusion septum is finished with the addition of either the upper collar 24 or the base member 32 to complete the process.

In use, the can body 15 is filled with a pre-determined volume of chosen beverage. Generally, the can is filled just below the surface edge 17 of the can body. The beverage may be carbonated or non-carbonated, alcoholic or non-alcoholic. The can body 15 is then sealed with the can end 12 having the integrated infusion septum as previously described, and the product is prepared for shipping. Once the product arrives at the desired destination, the can body 15 and can end 12 with the pre-filled beverage are placed on an assembly line for infusion. The beverage contained within the can body 15 may be infused prior to shipping or after shipping, as desired.

The method of infusion involves placement of the pre-filled and sealed beverage container having an integrated infusion port on a flat surface. A dispensing member, preferably a syringe with a piercing member, preferably a 21 gauge needle, is filled with the desired infusant. This may consist of herbal supplements, vitamins, flavorants, colorants etc. to impart health benefits or desired flavors or colors to a pre-filled beverage can. The needle may also have a different gauge depending upon the viscosity of the infusant. The infusion port 28 is normally sealed with respect to the atmosphere and is opened with the use of the needle N to disperse the infusant into the beverage can contents. At this point the needle N, the dispensing member or syringe S and the infusant are in fluid communication with the beverage once the needle N pierces the infusion port 28 at the area of reduced thickness, passes through the gate member 30 and the base member 32. Once the contents of the syringe is discharged using a plunger, in a known form, the needle N is withdrawn from the septum 22 and the septum is allowed to reseal so that the infusion port is completely sealed.

ALTERNATE EMBODIMENTS

FIGS. 9-25 show alternate forms of the infusion septum herein described. FIGS. 9-10 show a pull-style infusion septum using a standard horizontal type injection molding machine and simple secondary insertion of the infusion port with a multi-cavity mold. The post molded parts are secondarily loaded onto the can end and a self-sealing septum is created.

An infusion septum 50 shown in FIGS. 9, 10, 13 and 14 is inserted through the bottom portion or surface of the can lid or end 60 by mechanically pulling the smaller end of the flexible infusion septum through an opening 72 in the can end and snapping the upper portion, guide member or pull port 77 of the septum across an undercut 81 near the base of the infusion port. The undercut 81 is formed when the pull port is stretched into place. The outside diameter of the pull port is approximately 0.008 inches larger than the opening in the can that the port passes through. Once the pull port is pulled through the opening, a sealing occurs through the interference fit between the can opening edges and the pull port. If the beverage is carbonated, this aids further in applying pressure against the sealing surface. Preferably, any excess material is mechanically trimmed.

More specifically, there is provided in FIGS. 9-17, the infusion septum 50 integrated with a beverage container having a can body 52 defined by a cylindrical sidewall 54 including a closed bottom wall integrally formed with the sidewall 54. The sidewall 54 is tapered at both upper and lower ends to provide greater structural integrity for pressurized contents. The can body 52 is generally a conventional drawn and ironed aluminum alloy can body that is commercially used for carbonated and other beverages. Steel may also be used for the can body, such as is common in Europe and the manufacture of the can body is well known in the prior art. The can body 52 has an open upper end 56 with a circular top edge 58 that is oriented in a plane perpendicular to the vertical axis of the sidewall 52. The can body 52 may be a single serve can or larger size to accommodate a larger volume of beverage. The can body is pre-filled with the chosen beverage prior to placement of the can end 60.

The beverage can end 60 has a concentric shape with a circular periphery around which is formed a raised annular rim 62 projecting upwardly above a flat surface 64. Except as previously described, the can end 60 of the can 52 of FIG. 11 is also a generally conventional aluminum alloy can end member of the type currently commercially used for beverage cans having drawn and ironed one-piece can bodies. Thus, the procedures, and general overall configuration as well as the manner in which it is secured to the top edge 58 of the can body 52, are all well-known in the art.

Once the can end 60 is mounted on the open upper end of the beverage-filled can body 52, in a known manner, the rim 62 engages an upper edge 58 of the can body along a continuous annular double seam. The circular flat surface 64 lies substantially in a horizontal plane. The can end 60 has a scored opening 66 through which the beverage contained in the can may be poured or removed by drinking directly from the can or with a straw. Generally, and well known in the prior art, the scored opening 66 has a centrally located scored portion 68 on the metal of the can end 60 and a riveted pull tab system 70 for parting the can end metal along the score line 68 to open the first aperture or scored opening 66.

Prior to securing the can end 60 to the can body 62, the can end 60 is modified with an infusion port opening 72 that is punched through the can end and is defined by a circular opening that is formed near a peripheral edge of the can end 60. The formation of the port opening 72 in the can end 60 is accomplished by first using a mechanical/pneumatic punch press and creating an opening that is approximately 0.125 inches in diameter. This is a preferable dimension but other dimensions may be used without departing from the scope. Another method is to form the opening within the injection mold with a moveable punch pin and vacuum to remove any waste material. The punch pin method is preferable as it allows for precise hole placement to insure a centered infusion port. The diameter of the port opening 72 is in the range of $3/16$ to $1/8$ inches and is designed to receive the infusion septum 50 as shown in FIG. 9 and FIG. 13.

The one-piece infusion septum 50 has a base member 74 that is defined by a circular shaped, circumferentially outwardly extending member with an annular rim 76, a neck collar 75 extending outwardly and upwardly from the base member 74 and the removable pull port 77 extending from the neck collar 75. The pull port 77 has an inner wall and outer wall defining an annular recess or opening 78 having at least one passageway that extends perpendicular to a longitudinal axis of the port opening 78 and terminating in a locator or infusion port 79 that is centrally located along an upper surface of the neck collar 75 and having reduced thickness as shown in FIG. 14. The locator port is aligned over the port opening 72. The combination of the base member 74, the neck collar 75 and the pull port 77 form a one-piece septum that upon removal by undercut of a designated portion 81 of the pull port 77, creates the infusion port 79. The pull port or guide member 77 is adapted for extension upwardly therethrough a lower end of the port opening 72. Further, once the neck collar 75 and the pull port 77 are threaded through the port opening 72 and a designated portion of the pull port 77 is removed, an airtight seal is created between the septum and the port opening of the can end through an interference fit. The base member 74 also acts as a stop member and prevents the infusion septum from passing entirely through the port opening 72.

The infusion septum 50 is preferably made of a molded resilient plastic material such as polyethylene, vulcanized rubber, silicone, elastomers of any kind, thermoplastic elastomer (TPE) with a durometer or shore hardness rating between 35A to 80A, but preferably 35A to 50A. This is generally medical grade self-sealing rubber that is easily penetrable by needles ensuring a leak free seal without fragmentation after penetration and self-sealing. It is contemplated that the infusion septum may have other material hardness values that would provide an appropriate self-sealing material to provide a leak-proof seal.

The preferable method in terms of sealing integrity is to insert the infusion port from the bottom of the can end 60. This is done by mechanically "pulling" the smaller end of the flexible infusion septum through the opening 72 in the can end and snapping the pull port across an undercut 81 near the base of the infusion port which helps retain the port into a fixed position. The excess material from the "ear" is trimmed away leaving approximately 0.020" standing proud above the top of the can end 60. Further, the pressure from the carbonated gas helps seat the infusion ports larger diameter against the bottom of the can end.

To infuse the beverage or liquid product, a needle is inserted inside the hollow portion of the pull port and the thermoplastic elastomer is pierced through the bottom or lower portion of the pull port structure and infusion material is introduced into the beverage or liquid. A dispensing member, preferably a syringe with a piercing member, preferably a 21-gauge needle, is filled with the desired infusant. This may consist of herbal supplements, vitamins, flavorants, colorants etc. to impart health benefits or desired flavors or colors to a pre-filled beverage can. The needle may also have a different gauge depending upon the viscosity of the infusant. The needle N is inserted through the annular recess 78 of the septum 50, piercing the location port 79 resulting in the needle N having communication with the fluid in the container. Once the desired contents are infused within the fluid, the needle N is withdrawn from the septum resulting in the biasing force of the closed-container and the septum maintaining a leak-proof seal and self-sealing septum.

Once the container has been infused and to assure an aseptic and tamperproof condition, an adhesive button or dome gel label may be pressed over the pull port and sealed closed. The product is then ready for sale and transport to the customer. The uninfused cans which contain the beverage substrate are produced at preferably a copacker where the cans are filled and the can end with the infusion port seamed onto the can unit.

Another form of infusion septum is shown in FIGS. 18-25 for beverages or liquids that are noncarbonated and filled using a hot fill method as are many juices and sport drinks available with plastic bottling. This form has an infusion septum 83 with an integrated liner 85 which is necessary for a proper airtight seal and a cap member 86. The infusion septum 83 is designed to fit within the cap member 86 which has an opening 93 for an infusion port 89.

The infusion septum 83 comprises the infusion port 89 having an inner wall and outer wall defining an annular recess or opening 90 having at least one passageway that extends perpendicular to a longitudinal axis of the port opening 90 and terminating in a location recess 91 that is centrally located along an upper surface of the integrated liner 85 and having reduced thickness as shown in FIG. 19. The location recess is centrally aligned over the port opening 93 in the cap member. The port opening 93 is preferably created using a punch press on the cap member and is preferably located in the center of the cap member.

The integrated liner 85 extends radially outwardly from the port 89 and has a raised angled rim or guide member 84 projecting upwardly and outwardly from a neck member 92. The integrated liner 85 has a lower stepped member 87 that also extends radially outwardly and fits snugly along an underside of the cap 86 in touching or near touching relation to thread members 95 of the cap 86. The guide member 84 is inserted through the opening 93 in the cap member 86 preferably using a mechanical press. The front or top portion of the infusion port 89 has the lead in angle or guide member 84 which allows for proper alignment which is then pressed in and retained by an undercut on the neck member 92. The port opening 90 provides a path or conveyor for a piercing member, such as a needle, to pass through the infusion port opening 90, piercing the location recess 91, passing through the integrated liner 85 into the interior space of the container.

The infusion septum 83 is preferably made of a molded resilient plastic material such as polyethylene, vulcanized rubber, silicone, elastomers of any kind, thermoplastic elastomer (TPE) with a durometer or shore hardness rating between 35A to 80A, but preferably 35A to 50A. This is generally medical grade self-sealing rubber that is easily penetrable by needles ensuring a leak free seal without fragmentation after penetration and self-sealing. The infusion septum with the integrated liner are injection molded using the same thermoplastic elastomer which has the ability to withstand the 160 degrees F. required in the hot fill operation.

In use, the container body (not shown) is filled with a pre-determined volume of chosen beverage, generally with a temperature of around 160 degrees Fahrenheit. Preferably, the container is filled just below the surface edge of the container body with a small amount of 'head space' and the container is then capped and sealed with the modified cap member 86 having the integrated infusion septum as previously described. The container is preferably inverted to 'sterilize' the liner 83 including the edge 87. The beverage may be carbonated or non-carbonated, alcoholic or non-alcoholic. As the liquid in the container cools, a partial vacuum is formed further ensuring freshness of the beverage and the product is prepared for shipping. Once the product arrives at the desired destination, the container body with the pre-filled beverage are placed on an assembly line for infusion. The beverage contained within the container may be infused prior to shipping or after shipping, as desired.

The method of infusion involves placement of the pre-filled and sealed beverage container having an integrated infusion port on a flat surface. A dispensing member, preferably a syringe with a piercing member, preferably a 21-gauge needle, is filled with the desired infusant. This may consist of herbal supplements, vitamins, flavorants, colorants etc. to impart health benefits or desired flavors or colors to a pre-filled beverage container. The needle may also have a different gauge depending upon the viscosity of the infusant. The infusion septum port 90 is normally sealed with respect to the atmosphere and is opened with the use of the needle N to disperse the infusant into the beverage container contents. At this point the needle N and the infusant are in fluid communication with the beverage once the needle N pierces the location port 91 at the area of reduced thickness. Once the contents of the syringe is discharged using a plunger, in a known form, the needle N is withdrawn from the septum 83 and the septum is allowed to reseal so that the infusion port is completely sealed. To ensure an aseptic seal and tamper evidence, an adhesive button or label may be pressed over the infusion port 90.

While the present methods and forms have been described in connection with the illustrated embodiments, it will be appreciated and understood that modifications may be made without departing, from the true spirit and scope.

I claim:

1. A beverage container sealing end, comprising:
   a container for consumable beverages having a sealing end with an integrated infusion septum:
   an infusion port opening located on said sealing end wherein said sealing end comprises a cap member;
   said integrated infusion septum having a one-piece base member incorporating a neck collar member and a guide member with a location recess and wherein said infusion septum comprises a solid, uninterrupted piece prior to insertion of an infusion element;
   wherein said base member is in touching relation to a lower side of said sealing end cap member and extends the circumference of the said sealing end cap member; and
   said guide member centered over said infusion port opening, said guide member adapted to be drawn through said port opening.

2. The sealing end and infusion septum according to claim 1 wherein said base member extends radially outwardly and has an annular rim.

3. The sealing end and infusion septum according to claim 1 wherein said guide member has an inner wall, an outer wall defining a passageway extending perpendicular to a longitudinal axis of said port opening and terminating in said location recess.

4. The sealing end and infusion septum according to claim 1 wherein said location recess is aligned over said port opening.

5. The sealing end and infusion septum according to claim 1 wherein said port opening is centrally located over said sealing end cap member.

6. The sealing end and infusion septum according to claim 1 wherein said location recess has a reduced thickness with respect to said base member.

7. The sealing end and infusion septum according to claim 1 wherein said septum is resealable.

8. A beverage container sealing end, comprising:
   A container for consumable beverages having a sealing end with an integrated infusion septum:

said infusion septum having a circumferentially extending base member with an annular rim, a lower stepped member and a guide member with an infusion port extending from said base member and wherein said infusion septum comprises a one-piece continuous structure after removal of an infusion element from the infusion septum;

said sealing end comprising a cap member having a centrally located port opening;

said base member extending the circumference of said sealing end cap member and in touching relation to a lower side of said sealing end cap member;

said guide member adapted to pass through said port opening on a lower side of said sealing end cap member; and said guide member and said port opening forming an interference fit.

9. The beverage container sealing end having an integrated infusion septum according to claim 8 wherein said guide member has an angled upper portion.

10. The beverage container sealing end having an integrated infusion septum according to claim 8 wherein said lower stepped member is aligned above threaded members in said sealing end.

11. The beverage container sealing end having an integrated infusion septum according to claim 8 wherein said guide member includes a neck member.

12. The beverage container sealing end having an integrated infusion septum according to claim 8 wherein said guide member includes a location recess.

\* \* \* \* \*